United States Patent [19]

Pham et al.

[11] Patent Number: 5,043,360

[45] Date of Patent: * Aug. 27, 1991

[54] MANUFACTURE OF POLYURETHANE FOAM

[75] Inventors: Tu Pham, Grez-Doiceau; Louis Muller, Ottenburg, both of Belgium

[73] Assignee: Imperial Chemical Industries PLC, London, England

[*] Notice: The portion of the term of this patent subsequent to Mar. 20, 2007 has been disclaimed.

[21] Appl. No.: 456,737

[22] Filed: Dec. 26, 1989

Related U.S. Application Data

[63] Continuation of Ser. No. 247,467, Sep. 21, 1988, Pat. No. 4,910,231.

[30] Foreign Application Priority Data

Sep. 21, 1987 [GB] United Kingdom ................. 8722148
Aug. 22, 1988 [GB] United Kingdom ................. 8819879

[51] Int. Cl.$^5$ ............................................. C08G 18/14
[52] U.S. Cl. ...................................... 521/159; 521/160; 521/163; 521/165; 521/167; 521/172; 521/174
[58] Field of Search ............... 521/159, 160, 163, 165, 521/167, 172, 174

[56] References Cited

U.S. PATENT DOCUMENTS 4,384,050  5/1983  Guthrie ............................. 521/174

*Primary Examiner*—Maurice J. Welsh
*Attorney, Agent, or Firm*—Cushman, Darby & Cushman

[57] ABSTRACT

Substantially water blown flexible polyurethane foams, based on methylene diphenyl isocyanates, having a density ranging from 15–45 kg/m$^3$. Such foams may be obtained through a process substantially avoiding halocarbon blowing agents, which comprises reacting methylene diphenyl isocyanates with water and one or more isocyanate-reactive compounds selected from polyols and polyamines with a functionality of 2–4 and an average equivalent weight ranging from 750–5000, while the isocyanate index ranges from 10 to 60, and weight ratio of the isocyanate-reactive compound(s) to water is less than 20.

8 Claims, No Drawings

MANUFACTURE OF POLYURETHANE FOAM

This is a continuation of U.S. application Ser. No. 07/247,467 filed Sept. 21, 1988, now U.S. Pat. No. 4,910,231.

This invention relates to a process for manufacturing flexible foam products comprising urethane and/or urea linkages. More particularly the invention relates to a process for manufacturing such foam products in a one shot method which used methylene diphenyl isocyanate (MDI) based isocyanates and avoids halocarbon blowing agents.

The manufacture of flexible polyurethane foam is a well known process. Its chemistry and technology have been reviewed in reference books such as the "Polyurethane Chemistry and Technology" by H. Saunders and K. C. Frisch, the "Polyurethane Handbook" by G. Oertel and the "Flexible Polyurethane Foams and Chemistry and Technology" by G. Woods. The techniques described there are abundantly exploited industrially to produce flexible polyurethane foams for application in furniture, bedding, automotive, etc. Flexible polyurethane foams are generally produced by reacting polyols and polyisocyanates in the presence of water as carbon dioxide generator (isocyanate hydrolysis reaction). Halocarbons, such as chlorofluorocarbons (CFC), are often used as auxiliary blowing agents to supplement the blowing action of water. Tolylene-di-isocyanate (TDI) based isocyanates have long been applied as the preferred polyisocyanates.

More recently however methylene-diphenyl-isocyanates (MDI) have also found application in the manufacture of flexible polyurethane foams.

A reported advantage for the use of MDI over TDI is their lower vapour pressure which results in a safer use, from industrial hygiene point of view. One limitation however of MDI-based systems has been considered to lie in its inability to produce low density foams without the use of auxiliary blowing agents. Reference is made in this respect to publications by R. Volland (Journal of cellular plastics November–December 84, p. 416), by M. H. Courtney (proceedings of 30th annual SPI polyurethane technical and marketing meeting—p. 244) and R. C. Allen (proceedings of 30th annual SPI polyurethane technical and marketing meeting—p. 256). As there is a growing opposition to the use of CFC blowing agents this is clearly a serious drawback for MDI-based polyurethane flexible foams.

It has now been found surprisingly however that it is possible to produce low density foams based on MDI with water as substantially the sole foaming agent, by performing the foaming process under the conditions defined hereinafter.

Accordingly the invention provides a substantially halocarbon free, one shot process for manufacturing flexible polyurethane foams based on methylene diphenyl isocyanates and isocyanate-reactive compounds, which comprises reacting methylene diphenyl isocyanates with water and one or more isocyanate reactive compounds selected from polyols and polyamines with a functionality of 2–4 and an average equivalent weight ranging from 750 to 5000 whereas the isocyanate index ranges from 10 to 60, and whereas the weight ratio of the isocyanate-reactive compound(s) to water is less than 20.

The invention also provides a new class of products, which can be defined as substantially water blown (or substantially halocarbon free) flexible polyurethane foams based on methylene diphenyl isocyanates and isocyanate reactive compounds selected from polyols and polyamines, having a density ranging from 15–45 kg/m$^3$.

In accordance with a certain trend in the art, the expression "polyurethane foam" as used herein generally refers to cellular products as obtained by reacting polyisocyanates with isocyanate-reactive hydrogen containing compounds, in the presence of foaming agents, and in particular includes cellular products obtained with water as reactive foaming agent (involving a reaction of water with isocyanate groups yielding urea linkages and carbon dioxide). The expressions "isocyanate-reactive hydrogen containing compounds" or "isocyanate-reactive compounds" as used herein are furthermore intended to include polyols as well as polyamines. The expression "polyurethane foam" is thus intended also to include products which comprise urethane linkages together with urea linkages and even products which essentially comprise urea linkages with few or no urethane linkages.

The expression "flexible polyurethane foam" as used herein refers to cellular products which exhibit the following characteristics:
- a "hardness loss" value (as can be measured using the test method disclosed in ISO 3385) of not more than 45%; and
- a "hardness index" value (as can be measured using the test method disclosed in ISO 2439) ranging from 25 to 650.

The expressions "methylene diphenyl isocyanates" and "MDI" as used herein refers to polyisocyanate compositions comprising compounds selected from diphenylmethane diisocyanate isomers, polyphenyl polymethylene polyisocyanates and derivatives thereof bearing at least two isocyanate groups and containing carbodiimide groups, uretonimine groups, urethane groups, isocyanurate groups, allophanate groups, urea groups or biuret groups.

Methylenediphenyl isocyanates as thus defined are obtainable by condensing aniline with formaldehyde, followed by phosgenation, which process yields what is called crude MDI, by fractionation of said crude MDI, which process yields pure MDI and polymeric MDI, and by autocondensation of crude, pure or polymeric MDI, or reaction of excess of crude, pure or polymeric MDI with polyols or polyamines, which processes yield modified MDI, containing respectively carbodiimide, uretonimine, isocyanurate, allophanate or biuret groups and urethane or urea groups.

Thus the expression methylene diphenyl isocyanates as used herein is intended to encompass isocyanate bearing compounds sometimes referred to in the art as quasi-prepolymers or semi-prepolymers based on MDI, which in fact correspond to the modified MDI containing urethane and/or urea groups as defined above.

The expression substantially avoiding halocarbon blowing agents as used herein means that the compositions referred to contain at most such low levels of halocarbon blowing agents, as for instance chlorofluorocarbons (or CFC's), that the blowing due to said halocarbon blowing agents is less than 10% of the total foaming of the reactive formulation. Thus in particular the expression substantially avoiding halocarbon blowing agents means that the total formulation used in a process contains less than 1%, and more specifically less than 0.5% by weight of halocarbon blowing agent.

The expression "additives conventional in the art" as used herein refers to such optional or desirable ingredients as known in the art of flexible polyurethane foams, as more in particular reported in chapter 2 of the reference book "Flexible Polyurethane Foams" by George Woods, edited by Applied Science Publishers, the disclosure of which is incorporated herein by reference.

Thus the expression additives conventional in the art is in particular intended to include catalysts, chain-extending agents, cross-linking agents, curing agents, surfactants, fillers, fibrous reinforcements and flame retardants.

The expressions "isocyanate index" and "NCO-index" as used herein refer to the ratio of —NCO groups over reactive hydrogen atoms present in a polyurethane formulation, given as a percentage:

$$\text{NCO-index} = \frac{[\text{NCO}]}{[\text{active hydrogen}]} \times 100$$

In other words the NCO-index expresses the percentage of isocyanate actually used in a formulation with respect to the amount of isocyanate theoretically required for reacting with the amount of isocyanate reactive hydrogen used in a formulation.

The expression "active hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index one hydroxyl group is considered to comprise one reactive hydrogen, one primary amine group is considered to comprise two reactive hydrogens and one water molecule is considered to comprise two active hydrogens.

It should be observed that the isocyanate index as used herein is considered from the point of view of the actual foaming process involving the MDI ingredient, the polyol and/or polyamine ingredient and the water, regarded as a one shot system. Any isocyanate groups consumed in a preliminary step to produce modified MDI (including such MDI-derivatives referred to in the art as quasi or semi-prepolymers) or any active hydrogens reacted with isocyanate to produce modified polyols or polyamines, are not taken into account in the calculation of the isocyanate index. Only the free isocyanate groups and the free active hydrogens (including those of the water) present at the actual foaming process are taken into account.

The expression "one shot" method, process or system as used herein therefore refers to such processes where the MDI ingredient, the polyol and polyamine ingredient and the water are reacted with each other, excluding the so called prepolymer method in which MDI ingredients are pre-reacted with all polyol and polyamine ingredients, whereas the obtained product, possibly with additional MDI, is finally foamed with the water, but including so called semi- or quasi-prepolymer systems where some polyol and/or polyamine has been incorporated into the MDI ingredient.

The expressions "foam density" and "density" as used herein when referring to flexible polyurethane foams, relate, for the purpose of clear definition, to the density as would be measured on a foam sample obtained by foaming under free rise conditions, as opposed to foaming under vacuum or in a closed mould. The process of the invention is however not limited to such free rise conditions and in particular the process can for example be used for slabstock foam manufacture as well as for molding and vacuum foaming.

Methylene diphenyl isocyanates which can be employed in accordance with the invention include for example:

(a) diphenylmethane-4,4'-diisocyanate and mixtures thereof with other isomers of diphenylmethane diisocyanate;

(b) methylene bridged polyphenylpolyisocyanates prepared by phosgenation of mixtures of polyamines obtained by the condensation of aniline and formaldehyde and known in the art as "crude" or "polymeric MDI";

(c) polymers and oligomers obtained by reacting diphenylmethane diisocyanates or "crude MDI" with an isocyanate reactive compound, such as for example a monomeric glycol or polyol (or mixtures thereof) or a hydroxyl-ended polyester or polyether; such polymers and oligomers known in the art as "MDI prepolymers"; and (d) modified diphenylmethane diisocyanates or "crude MDI" in which a proportion of the isocyanate groups are converted into other functional groups such as carbodiimide, isocyanurate, uretonimine urethane, urea, biuret or allophanate groups, or in which a proportion of the isocyanate groups are reacted with an isocyanate-reactive compound.

The NCO-functionality of the used methylene diphenyl isocyanates preferably ranges from 1.9 to 2.9 and most preferably from 2 to 2.5.

Mixtures of MDI variants may also be used if desired.

Isocyanate reactive hydrogen containing compounds for use in accordance with the invention are selected from polyols and polyamines with a functionality of 2–4 and an average equivalent weight ranging from 750–5000, preferably from 1000 to 3000.

Suitable polyols which can be employed include for example those polyether and polyester polyols which have an average hydroxyl functionality from 2 to 4 and preferably from 2 to 3, and an average hydroxyl equivalent weight of from 750 to 5000 preferably from 1000 to 3000 and most preferably from 1000 to 2500.

Further polyols which may be employed include for example polythioethers, polyacetals, polycarbonates and polyesteramides comprising from 2 to 4, and preferably from 2 to 3 hydroxyl groups.

Suitable polyamines which can be employed include for example those polyether polyamines which have an average amine functionality from 2 to 4, and preferably from 2 to 3, and an average amine equivalent weight from 750 to 5000, preferably from 1000 to 3000 and most preferably from 1000 to 2500.

Suitable polyether polyols which can be employed include those which are prepared by reacting one or more alkylene oxides or substituted alkylene oxides with one or more active hydrogen containing initiators compounds. Suitable such oxides include for example ethylene oxide, propylene oxide, tetrahydrofuran, butylene oxides, styrene oxide, epichlorhydrin and epibromhydrin. Suitable initiator compounds include, for example, water ethylene glycol, propylene glycol, butane diol, hexane diol, glycerol, trimethylol propane, pentaerythritol, hexanetriol, hydroquinone, resorcinol, catechol, bisphenols, novolac resins, phosphoric acid.

Further suitable initiators include, for example, ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diamino-diphenylmethane, 4,4'-diaminodiphenylmethane, 1,3-phenylenediamine, 1,4-phenylenediamine, naphthylene-1,5-diamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene and 3,5,3',5'-tetraethyl-4,4'-diaminodiphenylmethane.

Suitable polyester polyols which can be employed include, for example, those prepared by reacting one or more polycarboxylic acids or anhydrides or esters thereof with one or more polyhydric alcohols. The polycarboxylic acids may be aliphatic, cycloaliphatic, aromatic and/or heterocyclic and may be substituted (e.g. with halogen) and/or unsaturated. Examples of carboxylic acids of this kind include glutaric acid, succinic acid, adipic acid, suberic acid, azelaic acid, sebacic acid, phthalic acid, isophthalic acid, trimellitic acid, tetrahydrophthalic acid, hexahydrophthalic acid, tetrachlorophthalic acid, maleic acid, fumaric acid, dimeric and trimeric fatty acids, which may be in admixture with monomeric fatty acids, terephthalic acid, and the like.

Example of suitable polyhydric alcohols include ethylene glycol; 1,2-propylene glycol; 1,3-propylene glycol; butylene glycols; 1,6-hexane diol; 1,8-octane diol; neopentyl glycol; cyclohexane dimethanol (1,4-bis-hydroxymethyl cyclohexane); 2-methyl-1,3-propane diol; glycerol; trimethylol propane; 1,2,6-hexane triol; 1,2,4-butane triol; trimethylol ethane; pentaerythritol; quinitol; diethylene glycol; triethylene glycol; tetraethylene glycol; polyethylene glycols; dipropylene glycol; polypropylene glycols; dibutylene glycol; or polybutylene glycols. It is also possible to use polyesters of lactones such as caprolactone, or hydroxy carboxylic acids such as hydroxy caproic acid.

Suitable polyether polyamines which can be employed include those which are prepared by amination of polyether polyols of the type described above. For use in accordance with the invention it is not necessary that the amination of the polyols be complete. Partially aminated polyether polyols of the type disclosed above can also be employed. Other suitable polyol compositions which can be used include for example polyhydroxyl derivatives which contain high molecular polyaddition or polycondensation polymers in dispersed or soluble state. Such polyhydroxyl derivatives can for example be obtained by carrying out a polyaddition reaction (for instance between polyisocyanates and amino-functional compounds) or a polycondensation reaction (for instance between formaldehyde and phenols and/or amines) in situ in such polyols as already disclosed above. Suitable are also polyhydroxyl derivative modified by vinylpolymerization, such as for example obtained by polymerizing styrene and acrylonitrile in the presence of polyether polyols or polycarbonate polyols.

In the process according to the invention the isocyanate index as defined above should range from 10 to 60 preferably from 15 to below 60 and most preferably from 20 to below 60.

The weight ratio of the polyols and/or polyamines to the water should be less than 20 and preferably should range from 3 to below 20 and most preferably from 5 to below 20.

As indicated above the process according to the invention leads to foamed products which were not accessible before, i.e. substantially water blown and/or halocarbon free, MDI-based polyurethane flexible foams having a free rise density below 45 kg/m$^3$, subsidiarily in the range from 15 to 45 kg/m$^3$, preferably in the range from 20 to 45 kg/m$^3$, most preferably in the range from 20 to 40 kg/m$^3$.

It is a further object of the invention to associate these desirable density properties of the foams to particularly desirable softness properties. Accordingly the invention provides such MDI based polyurethane foams with a density below 45 kg/m$^3$, which have a "hardness index" (as measured according to the method described in ISO 2439) ranging from 30 to 210 and preferably from 40 to 170.

The present invention further also covers polyurethane systems suitable for performing the process of the invention. The expression "system" as used herein refers to a set of individual components which are produced and/or marketed with the obvious purpose to be suitable for use in combination with each other to perform a specific process or to achieve specific performances.

Thus, the invention covers a reactive system for the manufacture of flexible polyurethane foams involving a substantially halocarbon free isocyanate composition based on methylene diphenyl isocyanates and a substantially halocarbon free isocyanate reactive composition comprising one or more polyols and/or polyamines with a functionality of 2-4 and an average equivalent weight ranging from 750-5000 and at least 5 parts by weight of water per 100 parts of polyol and polyamine, optionally together with additives conventional in the art, said isocyanate composition and isocyanate reactive composition being provided in proportions to give an isocyanate index ranging from 10 to 60.

The invention also covers polyurethane formulations suitable for performing the process of the invention. The expression "formulation" as used herein refers to a written or verbal disclosure reciting individual ingredients in the appropriate proportions to be capable to perform a specific process or to achieve specific performances.

Thus, the invention covers any direct or indirect, written or verbal incitation to manufacture flexible polyurethane foams using a substantially halocarbon free isocyanate composition based on methylene diphenyl isocyanates and a substantially halocarbon free isocyanate reactive composition comprising one or more polyols and/or polyamines with a functionality of 2-4 and an average equivalent weight ranging from 750-5000 and at least 5 parts by weight of water per 100 parts of polyol and polyamine, optionally together with additives conventional in the art, said isocyanate composition and isocyanate reactive composition being provided in proportions to give an isocyanate index ranging from 10 to 60.

The manufacture of flexible foams in accordance with the present invention may be performed using techniques well known in the art and abundantly commented in the reference books referred to more above. Thus the process can be performed in conventional ways as free rise method or as moulding method, and may be used to manufacture moulded foams as well as slabstock, either by a continuous or by a discontinuous process.

The invention is illustrated but not limited by the following examples.

EXAMPLES

In these examples the following hand mix procedure has been followed. The isocyanate-reactive compound, the water and additives were premixed for 15 seconds at 1500 RPM. The isocyanate was then added, with a further 5 second mixing at 2000 RPM. The mixtures were poured in 5 liter polyethylene buckets. The foams were allowed to cure for 24 hours. Pads of 10×10×5 cm were then cut from the center of the bun for physical testing. Using this procedure flexible polyurethane foams were prepared using the formulations listed hereinbelow. In these formulations the following references are used to designate the various components:

I-R designates the isocyanate reactive compound(s) according to the definition given above
C designates catalyst component(s)
C-L designates cross-linker component(s)
S designates stabiliser component(s) and
ISO designates the isocyanate component(s).

EXAMPLE 1

| I-R | Daltocel T-3275 (from ICI)(1) | 100 | pbw |
|---|---|---|---|
| S | Tegostab B-4113 (from Goldschmidt) | 1 | pbw |
| C | Dabco 33LV (from Air Products) | 2 | pbw |
|  | Water | 7.5 | pbw |
| ISO | Suprasec DNR (from ICI)(2) | 75.0 | pbw |

(1)Daltocel T-3275 is a polyether polyol having a hydroxyl value of 32 mg KOH/g.
(2)Suprasec DNR is a polymeric MDI having a free NCO-content of 30.7%.

The isocyanate index was 60.
The cured foam had a density of 19 kg/m$^3$.
The indentation hardness index, as measured according to the method described in ISO 2439, had a value of 90.

EXAMPLE 2

| I-R | Polypropylene glycol Mw 2000 | 100 | pbw |
|---|---|---|---|
| S | Tegostab B-2370 (from Goldschmidt) | 1.5 | pbw |
| C | Dabco 33LV (from Air Products) | 0.8 | pbw |
| C | Stannous octoate | 1.0 | pbw |
|  | Water | 8.0 | pbw |
| ISO | Suprasec DNR (from ICI)(2) | 59.0 | pbw |

(2)Suprasec DNR is a polymeric MDI having a free NCO-content of 30.7%.

The isocyanate index was 43.
The cured foam had a density of 24 kg/m$^3$.

EXAMPLE 3

| I-R | Polyurax U-26-03 (from BP Chemicals)(3) | 100 | pbw |
|---|---|---|---|
| C | Dabco 33LV (from Air Products) | 0.3 | pbw |
| C | Niax A1 (from Union Carbide) | 0.2 | pbw |
| S | Tegostab B-4113 (from Goldschmidt) | 1.0 | pbw |
|  | Water | 9.0 | pbw |
| ISO | Suprasec DNR (from ICI)(2) | 53.4 | pbw |

(2)Suprasec DNR is a polymeric MDI having a free NCO-content of 30.7%.
(3)Polyurax U 26-03 is a polymer polyol having a hydroxyl value of 28 mg KOH/g.

The isocyanate index was 37.
The cured foam had a density of 25 kg/m$^3$.

EXAMPLE 4

| I-R | Jeffamine D 2000 (from Texaco)(4) | 100 | pbw |
|---|---|---|---|
| C | Niax A1 (from Union Carbide) | 0.5 | pbw |
|  | Water | 15.0 | pbw |
| ISO | Experimental polyisocyanate(5) | 70.0 | pbw |

(4)Jeffamine D 2000 is a polyoxyalkylene diamine having an average Mw of 2000.
(5)The experimental isocyanate was a modified pure MDI with a free NCO-content of 25%.

The isocyanate index was 22.
The cured foam had a density of 24 kg/m$^3$.

EXAMPLE 5

| I-R | Daltocel F2805 (from ICI)(6) | 100 | pbw |
|---|---|---|---|
| S | Tegostab B-4113 (from Goldschmidt) | 0.5 | pbw |
| C | Dabco 33LV (from Air Products) | 1.5 | pbw |
| C | Dibutyltindilaurate | 0.2 | pbw |
|  | Water | 5.0 | pbw |
| ISO | Suprasec VM20 (from ICI)(7) | 36.5 | pbw |

(6)Daltocel F2805 is a polyether polyol having a hydroxyl value of 28 mg KOH/g.
(7)Suprasec VM 20 is a modified pure MDI with a free NCO-content of 29.0%.

The isocyanate index was 41.

We claim:

1. Substantially water blown "flexible polyurethane foam" based on methylene diphenyl isocyanates and isocyanate reactive compounds selected from polyols and polyamines, having a density ranging from 15 kg/m$^3$ to less than 25 kg/m$^3$.

2. Flexible polyurethane foam according to claim 1 obtained by a one shot process.

3. Flexible polyurethane foam according to claim 1, characterised by an indentation hardness index ranging from 30 to 210 Newton, when measured according to the method described in ISO 2439.

4. Process for manufacturing a flexible polyurethane foam according to claim 1, which comprises reacting methylene diphenyl isocyanates with water and one or more isocyanate-reactive compounds selected from polyols and polyamines with a functionality of 2-4 and an average equivalent weight ranging from 750-5000, optionally together with additives conventional in the art, whereas the isocyanate index ranges from 10 to 60, and whereas the weight ratio of the isocyanate-reactive compound(s) to water is less than 20.

5. Process according to claim 4, characterised in that one or more isocyanate-reactive compounds are selected from polyether polyols, polyester polyols and polyether polyamines.

6. Process according to claim 4, characterised in that the weight ratio of the isocyanate-reactive compound(s) to the water ranges from 3 to below 20.

7. Reactive system for the manufacture of flexible polyurethane foam, according to claim 1 involving a substantially halocarbon free isocyanate composition based on methylene diphenyl isocyanates and a substantially halocarbon free isocyanate-reactive composition comprising one or more polyols and/or polyamines with a functionality of 2-4 and an average equivalent weight ranging from 750-5000 and at least 5 parts by weight of water per 100 parts of polyol and polyamine, optionally together with additives conventional in the art, said isocyanate composition and isocyanate-reactive composition being provided in proportions to give an isocyanate index ranging from 10 to 60.

8. Polyurethane foam formulation constituting an incitation to manufacture a flexible polyurethane foam according to claim 1, by using a substantially halocarbon free isocyanate composition based on methylene diphenyl isocyanates and a substantially halocarbon free isocyanate reactive composition comprising one or more polyols and/or polyamines with a functionality of 2-4 and an average equivalent weight ranging from 750-5000 and at least 5 parts by weight of water per 100 parts of polyol and polyamine, optionally together with additives conventional in the art, said isocyanate composition and isocyanate reactive composition being provided in proportions to give an isocyanate index ranging from 10 to 60.

* * * * *